Sept. 20, 1955     H. A. PFEIFFER     2,718,416
PULLEY AND CLUTCH ASSEMBLY
Filed April 2, 1954

INVENTOR.
Henry A. Pfeiffer
BY Victor J. Evans & Co.
ATTORNEYS

United States Patent Office 2,718,416
Patented Sept. 20, 1955

2,718,416
PULLEY AND CLUTCH ASSEMBLY

Henry A. Pfeiffer, Fredericksburg, Tex.

Application April 2, 1954, Serial No. 420,569

2 Claims. (Cl. 287—52.08)

This invention relates to a pulley mounting in which a pulley may be, selectively, freely rotatable on a shaft or adapted to be used as a driving pulley, and in particular a pulley used in combination with a motor vehicle air conditioning compressor wherein clutch elements of the pulley may be adjusted so that the compressor may operate during the summer and will remain stationary in the winter or when use of the compressor is not desired.

The purpose of this invention is to provide means for disconnecting a driving element of a transmission assembly from a driven element without removing belts or other positive driving elements and wherein the parts may readily be set to cause the driving elements to operate as desired.

In numerous instances and particularly on motor vehicles elements are driven from the crank shaft or cam shaft and, because of the cost, it is not desirable to use a conventional clutch for disconnecting the parts when use of the apparatus is not desired. For this reason apparatus continues to operate with the result that unnecessary wear develops in the bearings and other parts. With this thought in mind this invention contemplates a cam actuated clutch mechanism mounted in combination with the hub of a pulley whereby cams or eccentrics may be set to, selectively, cause the shaft to rotate with the pulley or to permit the pulley to rotate freely on the shaft with the shaft remaining stationary.

The object of this invention, is therefore, to provide clutch elements adapted to be incorporated in a pulley mounting whereby the clutch elements may readily be set to engaging or disengaging positions.

Another object of the invention is to provide clutch mechanism adapted to be installed in a pulley of a motor vehicle air conditioning compressor without changing the size or other elements of the pulley.

A further object of the invention is to provide a combination pulley and clutch assembly for use on an air conditioning compressor in which the device is of a simple and economical construction.

With these and other objects and advantages in view the invention embodies a sleeve having an annular flange with arcuate recesses therein on one end with a pulley rotatably mounted on the sleeve and having eccentrics or cams adjustably mounted thereon and positioned to engage or disengage the recesses in the flange of the sleeve and in which the sleeve is adapted to be keyed to a shaft or the like.

Other features and advantages of the invention will appear from the following description taken in connection with the drawing, wherein.

Figure 4:
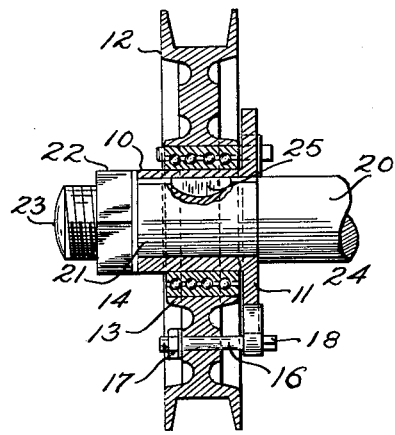
Figure 4 is a longitudinal section through the pulley taken on line 4—4 of Fig. 1, the shaft being shown in elevation, and parts thereof being broken away to show a key for securing the sleeve or hub to the shaft.

Referring now to the drawing wherein like reference characters denote corresponding parts the improved pulley mounting of this invention includes a sleeve 10 having an annular flange 11 on one end, a pulley 12 having a hub 13 rotatably mounted on the sleeve 10 with a ball bearing 14 and a plurality of eccentrically positioned cams 15 mounted on bolts 16 and adapted to be secured in adjusted positions with nuts 17 threaded on ends of the bolts, as shown in Fig. 4. The ends of the bolts opposite to the ends on which the nuts 17 are positioned are provided with studs 18 by which the bolts may be rotated with a wrench or the like to adjust the positions of the cams 15.

Figure 1:
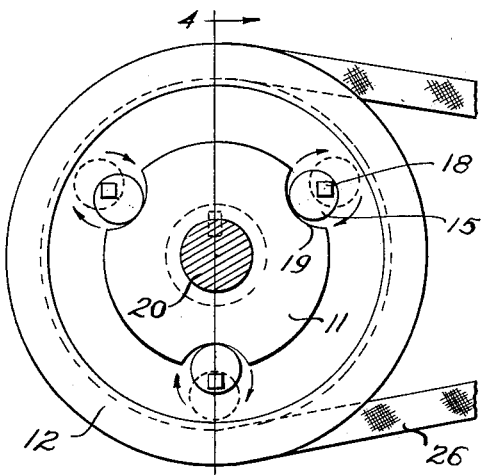
Figure 1 is an end elevational view looking toward the pulley and flange of the sleeve showing the eccentric or cam elements positioned whereby the sleeve and shaft are rotated by the pulley.
Figure 2:
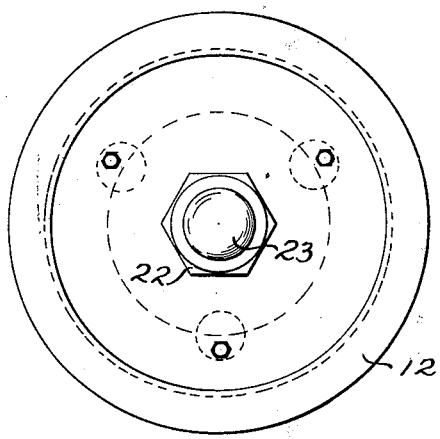
Figure 2 is an end elevational view similar to that shown in Fig. 1 looking toward the opposite side of the pulley.
Figure 3:
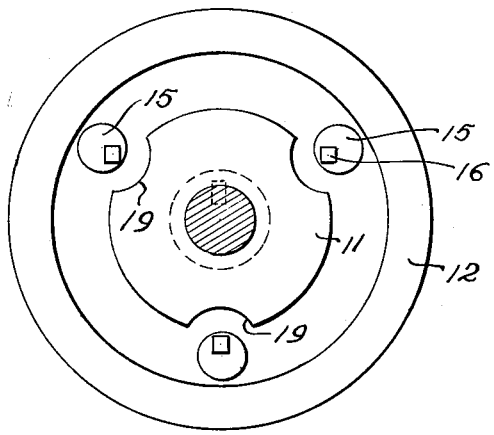
Figure 3 is an end elevational view similar to that shown in Fig. 1 showing the eccentric or cam elements in outwardly extended or disengaging positions, wherein the pulley is free to rotate on the sleeve.

The flange 11 on the end of the sleeve 10 is provided with arcuate recesses 19 that are positioned to receive the cams 15, as shown in Fig. 1, and with the parts assembled as shown and described the cams are adapted to be positioned, as illustrated in Fig. 1 when it is desired to drive the shaft 20 by the pulley 12, such as in the summer when it is desired to operate the air conditioning compressor, and wherein, by the same means the cams are adapted to be adjusted to the positions shown in Fig. 3 wherein the pulley 12 may rotate freely on the shaft 20.

As illustrated in Fig. 4 the sleeve 10 is positioned on a reduced portion 21 of the shaft 20 and a nut 22 on a threaded stud 23 at the end of the shaft clamps the sleeve against a shoulder 24 on the shaft. The sleeve is also secured to the shaft with a key 25 that extends into the shaft, as shown in Fig. 4 and that also extends into a slot in the sleeve, as shown.

With the clutch elements formed in this manner the sleeve or hub 10 may readily be inserted in the hub 13 of the pulley with a bearing such as the ball bearing 14 between the pulley and sleeve and by this means the pulley may rotate freely throughout the winter without wearing parts of the compressor or other air conditioning apparatus.

The pulley may be of the type using a V-belt, as suggested by the belt 26 although it will be understood that the belt and pulley may be of any suitable type or design.

It will be understood that modifications, within the scope of the appended claims, may be made in the design and arrangement of the parts without departing from the spirit of the invention.

What is claimed is:

1. A pulley assembly comprising a sleeve having an annular flange with recesses in the periphery extended from one end, a pulley positioned on the sleeve, a ball bearing rotatably mounting the pulley on the sleeve, bolts extended through the pulley and cams eccentrically mounted on the bolts, said bolts being positioned whereby the cams coact with recesses in the periphery of the flange for, selectively, locking the pulley to rotate with the sleeve or disengaging the pulley from the sleeve.

2. In a motor vehicle air conditioning compressor pulley assembly, the combination which comprises a sleeve having a flange on one end adapted to be positioned on a shaft, a key adapted to key the sleeve to the shaft, said flange having arcuate recesses in the peripheral surface, a pulley positioned on the sleeve, a ball bearing rotatably mounting the pulley on the sleeve, bolts mounted in the pulley, cams eccentrically mounted on the bolts and positioned to coact with the arcuate recesses of the flange, and means for clamping the bolts with the cams in adjusted positions whereby the cams, selectively, operatively engage the flange in said recesses or are disengaged from the flange whereby the pulley is free to rotate on the sleeve.

References Cited in the file of this patent

UNITED STATES PATENTS

| Number | Name | Date |
|---|---|---|
| 276,956 | Bucklin et al. | May 1, 1883 |
| 390,583 | Frey | Oct. 2, 1888 |
| 391,004 | Wright | Oct. 9, 1888 |
| 591,798 | Strauss | Oct. 12, 1897 |
| 1,250,826 | Feilhauser | Dec. 18, 1917 |
| 1,437,108 | Jones | Nov. 28, 1922 |
| 2,451,342 | Kent | Oct. 12, 1948 |